March 2, 1943. F. LUCAN 2,312,429
IGNITING AND OPERATING CIRCUIT FOR ELECTRIC DISCHARGE TUBES
Filed Sept. 21, 1940
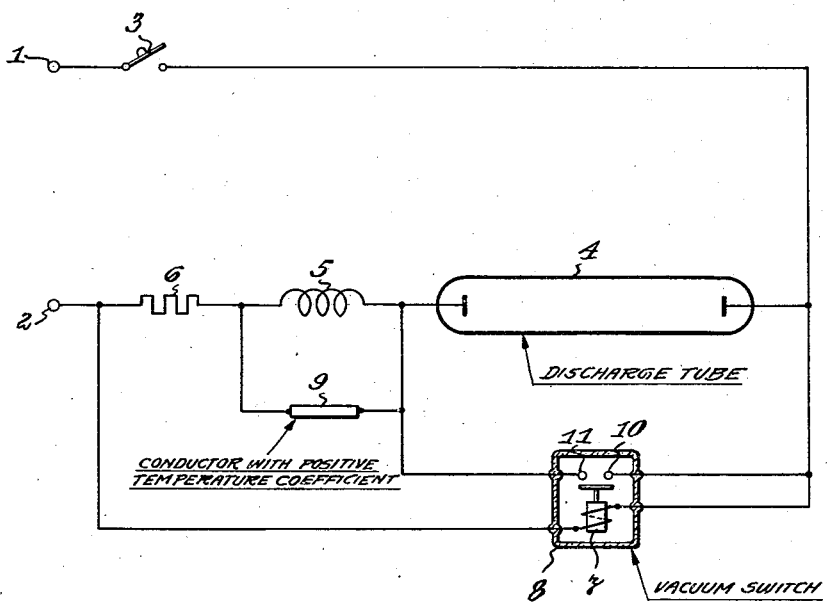
INVENTOR
FRITZ LUCAN
BY
ATTORNEY Patented Mar. 2, 1943

2,312,429

UNITED STATES PATENT OFFICE 2,312,429

IGNITING AND OPERATING CIRCUIT FOR ELECTRIC DISCHARGE TUBES

Fritz Lucan, Berlin-Nikolassee, Germany; vested in the Alien Property Custodian

Application September 21, 1940, Serial No. 357,765
In Germany August 18, 1939

3 Claims. (Cl. 176—124)

The present invention relates to a circuit arrangement for igniting and operating discharge tubes, and especially to such a circuit utilizing a reactor.

An object of the invention is to provide a circuit arrangement for igniting and operating discharge tubes in which the size of the reactor is reduced considerably over the size of the reactor normally provided in such a circuit.

Other objects and advantages of the invention will be apparent from the following description and drawing in which the figure is a diagrammatic view of a preferred circuit embodying the invention.

Ignition devices are known in which the ignition-impulse is produced by a reactor in combination with an interrupter. In known arrangements of this kind, the load-current must flow through the reactor, and for this reason the size of the reactor has to be relatively large. In view thereof, there have been proposed already arrangements in which only part of the normal continuous load-current has to flow through the reactor.

However, these known arrangements include a contact-making relay which, in order to prevent overloading of the relatively small reactor, must short-circuit this reactor upon the completion of the ignition process. But the use of such a contact-making relay has several disadvantages from an operating standpoint. Moreover, the gain obtainable by making the reduction in the reactor size permissible in the instances just outlined will be offset again by the added cost of the contact-making relay.

The present invention in its specific embodiment provides, in a circuit arrangement for igniting and for operating electric discharge tubes on direct current where the ignition-impulse is supposed to be produced with the aid of a reactor in conjunction with an interrupter, a conductor whose conductivity increases when its temperature rises. This conductor is connected in parallel with the reactor, so that under normal operating conditions the major part of the load-current will flow through it.

An example of a circuit arrangement in accordance with the present invention is given in the single figure of the drawing.

The terminals 1, 2 of the circuit shown are connected to a direct current source. The circuit comprises a switch 3, a discharge tube 4, a reactor 5 provided for ignition purposes, and a ballast resistor 6 which must limit the magnitude of the discharge current flowing through the discharge tube 4; these circuit members are all connected in series. The magnet coil 7 of a vacuum switch 8 is connected in parallel with the portion of the circuit containing in series the circuit members 4, 5, 6. In accordance with the invention, a conductor 9 whose conductivity increases when its temperature rises is connected in parallel with the reactor 5. This conductor may be of uranium dioxide, copper oxide, carbon or other suitable materials.

The circuit arrangement described in the preceding paragraph operates as follows: At the instant at which the switch 3 is closed, voltage is applied to the magnet coil 7 of the vacuum switch 8, so that the circuit 1—3—10—11—5—9—6—2 established at this instant is interrupted again by said vacuum switch. As a consequence thereof, the reactor 5 generates a voltage-impulse, and this voltage-impulse attempts to produce an equalizing current flowing along the discharge path in the discharge tube 4. Immediately after the initiation of the discharge in the tube 4 by this equalizing current, a flow of load-current follows; in other words, the ignition process is followed by a flow of discharge-current supplied by the direct current source, and the latter current produces in the reactor a voltage drop whose magnitude is determined by the resistance of the reactor winding. Since this voltage drop is being applied to the terminals of the conductor 9 whose conductivity increases when its temperature rises, this conductor 9 will be heated up and at the same time its resistance will be lowered, so that a gradually increasing portion of the total load-current will flow through said conductor, while accordingly the portion of the load-current that flows through the reactor 5 will gradually decrease in magnitude. It is thus seen that the circuit can be arranged in such a manner that, without resorting to the use of a contact-making relay, it becomes feasible to design the ignition reactor for a nominal current that is much lower than the load-current, obtaining accordingly a saving in materials and a reduction in cost.

It is apparent that various modifications may be made in the preferred circuit described and accordingly only such limitations are intended upon the invention as are necessitated by the spirit and scope of the following claims.

I claim:

1. A circuit arrangement for igniting and operating electric discharge tubes comprising a discharge tube, a reactor for ignition purposes in series with the tube to one terminal thereof, a ballast resistor in series with said reactor and tube to the same said terminal thereof, and a conductor whose conductivity increases when its temperature rises connected constantly in parallel closed circuit with said reactor and progressively diverting current from the reactor to pass through said conductor after current begins to flow.

2. A circuit arrangement for igniting and operating electric discharge tubes comprising a discharge tube, a reactor for ignition purposes in series with the tube to one terminal thereat, a ballast resistor in series with said reactor and tube to the same said terminal thereof, and a conductor whose conductivity increases when its temperature rises connected constantly in parallel closed circuit with said reactor and progressively diverting current from the reactor to pass through said conductor after current begins to flow, said conductor comprising essentially copper dioxide.

3. A circuit arrangement for igniting and operating electric discharge tubes comprising a discharge tube, a reactor for ignition purposes in series with the tube to one terminal thereof, a ballast resistor in series with said reactor and tube to the same said terminal thereof, and a conductor whose conductivity increases when its temperature rises connected constantly in parallel closed circuit with said reactor and progressively diverting current from the reactor to pass through said conductor after current begins to flow, said conductor comprising essentially carbon.

FRITZ LUCAN.